United States Patent
Haldeman et al.

(10) Patent No.: US 10,654,567 B2
(45) Date of Patent: May 19, 2020

(54) COMPOSITE YOKE FITTING FOR BEARING ATTACHMENT TO ROTORCRAFT BLADE

(71) Applicant: Bell Helicopter Textron Inc., Fort Worth, TX (US)

(72) Inventors: Andrew Haldeman, Fort Worth, TX (US); Frank Bradley Stamps, Colleyville, TX (US); Drew Sutton, Hurst, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 286 days.

(21) Appl. No.: 14/669,977

(22) Filed: Mar. 26, 2015

(65) Prior Publication Data

US 2016/0280367 A1    Sep. 29, 2016

(51) Int. Cl.
*B64C 27/46*    (2006.01)
*B64C 27/48*    (2006.01)
*B64C 27/473*    (2006.01)

(52) U.S. Cl.
CPC .............. *B64C 27/46* (2013.01); *B64C 27/48* (2013.01); *B64C 2027/4736* (2013.01)

(58) Field of Classification Search
CPC .. B64C 27/46; B64C 27/48; B64C 2027/4736
See application file for complete search history.

(56) References Cited

U.S. PATENT DOCUMENTS

| | | | |
|---|---|---|---|
| 3,874,815 A * | 4/1975 | Baskin | B64C 27/33 244/17.25 |
| 4,008,980 A | 2/1977 | Noehren | |
| 4,047,839 A | 9/1977 | Ferris et al. | |
| 4,227,857 A | 10/1980 | Reyes | |
| 4,293,276 A | 10/1981 | Brogdon | |
| 4,349,316 A * | 9/1982 | Hughes | B64C 27/82 416/104 |
| 4,369,018 A | 1/1983 | Brunsch | |
| 4,430,045 A | 2/1984 | Cresap | |
| 4,626,172 A | 12/1986 | Mouille et al. | |
| 4,898,515 A * | 2/1990 | Beno | B29C 70/083 416/134 A |

(Continued)

FOREIGN PATENT DOCUMENTS

| | | |
|---|---|---|
| EP | 2001025 | 1/1979 |
| EP | 2033861 | 5/1980 |

(Continued)

OTHER PUBLICATIONS

Extended European Search Report issued in European Application No. 13168626.3 dated Nov. 11, 2013; 9 pages.

(Continued)

*Primary Examiner* — Justin D Seabe
*Assistant Examiner* — Cameron A Corday

(57) ABSTRACT

A rotor blade assembly includes a rotor blade comprising an inboard end and an outboard end. A composite yoke fitting made from a composite material is attached to the rotor blade. The composite yoke fitting includes an outboard portion inserted into the inboard end of the rotor blade, an inboard portion, and a flexure region about which the rotor blade is configured to flex. The inboard portion and the flexure region are outside the rotor blade.

20 Claims, 6 Drawing Sheets

(56) References Cited

U.S. PATENT DOCUMENTS

| | | | |
|---|---|---|---|
| 5,286,167 A | 2/1994 | Byrnes et al. | |
| 5,690,474 A | 11/1997 | Byrnes et al. | |
| 6,659,722 B2 * | 12/2003 | Sehgal | B64C 27/473 416/134 A |
| 7,665,969 B2 | 2/2010 | Stamps et al. | |
| 8,801,378 B2 * | 8/2014 | Baskin | B64C 11/06 416/104 |
| 9,073,625 B1 | 7/2015 | Ingram, III | |
| 2006/0165527 A1 | 7/2006 | Stamps et al. | |
| 2013/0004311 A1 | 1/2013 | Stamps et al. | |
| 2014/0271200 A1 | 9/2014 | Sutton et al. | |

FOREIGN PATENT DOCUMENTS

| | | |
|---|---|---|
| EP | 0022918 | 1/1981 |
| EP | 0097885 | 1/1984 |
| EP | 0323857 | 7/1989 |
| EP | 2007/106064 | 9/2007 |

OTHER PUBLICATIONS

Communication Pursuant to Article 94(3) EPCT issued in European Application No. 13168626.3 dated Mar. 18, 2014; 4 pages.
Communication under Rule 71(3) EPC issued in European Application No. 13168626.3 dated Sep. 15, 2014; 35 pages.
Maresh, Andrew et al. Composite Rotor Systems Using Two Race Track Style Cantilevered Yokes; U.S. Appl. No. 13/801,733, filed Mar. 13, 2013.
Maresh, Andrew et al. "High Flapping Yoke Hub Assembly Using a Cylindrical Elastomeric Attachment to Avoid Holes;" U.S. Appl. No. 13/797,334, filed Mar. 12, 2013.
Sutton, Drew et al., Flexing Clevis Arrangement Bolted Joint Attachment for Flexible Rotor ub with high Offset and High Flapping, Application filed Mar. 13, 2013.
European Search Report issued in European Application No. 13180136.7 dated May 13, 2014, 5 pages.
Communication pursuant to Article 94(3) EPC issued in European Appplication No. 13180136.7 dated May 23, 2014, 6 pages.
Communication pursuant to Article 94(3) EPC issued in European Appplication No. 13180136.7 dated Feb. 12, 2015, 4 pages.
Invitation pursuant to Rule 62a(1) EPC issued in European Application No. 14152690.5 dated Jun. 11, 2014, 4 pages.
Partial European Search Reportt issued in European Applcation No. 14152690.5 dated Oct. 9, 2014, 7 pages.
European Search Report issued in European Application No. 15188195.0 dated Apr. 22, 2016; 4 pages.
Communication Pursuant to Article 94(3) EPC issued in European Application No. 15188195.0 dated May 4, 2016; 5 pages.
Communication under Rule 71(3) EPC issued in European application No. 14152690.5 dated Nov. 17, 2015; 27 pages.
Communication under Rule 71(3) EPC issued in European Application No. 13180136.7 dated Mar. 11, 2016; 48 pages.
Office Action issued in U.S. Appl. No. 13/797,334 dated Nov. 5, 2015, 12 pages.

* cited by examiner

COMPOSITE YOKE FITTING FOR BEARING ATTACHMENT TO ROTORCRAFT BLADE

TECHNICAL FIELD

This specification relates to rotor blades, e.g., tail rotor blades, of a rotorcraft, e.g., a helicopter.

BACKGROUND

Helicopters often include a tail rotor assembly, which includes two or more blades rotated about a central axis of rotation to generate thrust. The thrust can be used to counter the torque effect created by a main rotor assembly and can also be used to allow a pilot to control the yaw of a helicopter. The amount and direction of the thrust is generally controlled by collectively changing the angles of attack of all of the tail rotor blades together.

Tail rotor blades can also accommodate at least some amount of cyclic flapping and feathering to counter the dissymmetry of lift phenomenon that occurs as a helicopter moves through the air. For example, as a tail rotor blade moves in the same direction as the helicopter movement (e.g., an advancing blade in forward flight), the tail rotor blade experiences a greater air speed, generates more thrust, and flaps in the direction opposite to the thrust. In another example, as a tail rotor blade moves in the opposite direction as the helicopter movement (e.g., a retreating blade in forward flight), the tail rotor blade experiences a lower air speed, generates less thrust, and flaps in the direction of the thrust. To compensate for the dissymmetry of lift and control the amount of flapping, tail rotor blades can be designed to decrease the angle of attack of the blades as the blades move in the same direction as the helicopter movement and increase the angle of attack of the blades as they move in the opposite direction of the helicopter movement. The cyclic changing of the angles of attack is commonly referred to as feathering or delta-3 and is used to balance the thrust generated by each of the tail rotor blades and limit flapping angles.

SUMMARY

This disclosure relates to composite yoke fitting for bearing attachment to rotorcraft blade.

In some aspects, a rotor blade assembly includes a rotor blade comprising an inboard end and an outboard end. A composite yoke fitting made from a composite material is attached to the rotor blade. The composite yoke fitting includes an outboard portion inserted into the inboard end of the rotor blade, an inboard portion, and a flexure region about which the rotor blade is configured to flex. The inboard portion and the flexure region are outside the rotor blade.

This, and other aspects, can include one or more of the following features. The inboard portion can be configured to attach to a rotor hub assembly configured to rotate the rotor blade. The inboard portion can include a cutout configured to attach to a bearing in the rotor hub assembly. The cutout can include a through hole formed in the inboard portion. The composite yoke fitting can taper from the inboard portion toward the outboard portion. The flexure region can be between the outboard portion and the inboard portion. The flexure region can have a thickness less than a thickness of the outboard portion and a thickness of the inboard portion. The rotor blade can include an upper skin portion and a lower skin portion. The outboard portion can be sandwiched and bonded between the upper skin portion and the lower skin portion. The composite yoke fitting can include an upper fitting portion and a lower fitting portion. A portion of the upper fitting portion and a portion of the lower fitting portion are inserted into the inboard end of the rotor blade.

In some aspects, an outboard portion of a composite yoke fitting is inserted into an inboard end of a rotor blade. The composite yoke fitting includes an outboard portion and a flexure region about which the rotor blade is configured to flex. The inboard portion and the flexure region are outside the rotor blade. The composite yoke fitting is bonded to the rotor blade.

This, and other aspects, can include one or more of the following features. The inboard portion can be attached to a rotor hub assembly configured to rotate the rotor blade. The inboard portion can include a cutout configured to attach to a bearing in the rotor hub assembly. The inboard portion can be attached to the rotor hub assembly through the cutout. The cutout can include a through hole formed in the outboard portion. The flexure region can be between the inboard portion and the outboard portion. The flexure region can have a thickness less than a thickness of the outboard portion and a thickness of the inboard portion. The rotor blade can include an upper skin portion and a lower skin portion. The outboard portion of the composite yoke fitting can be inserted between the upper skin portion and the lower skin portion. The composite yoke fitting can include an upper fitting portion and a lower fitting portion. A portion of the upper fitting portion and the lower fitting portion can be inserted between and bonded to a portion of the upper skin portion and a portion of the lower skin portion.

In some aspects, a composite yoke fitting including an outboard portion, a flexure region, and an inboard portion is attached to a rotor blade. The outboard portion extends into the rotor blade. The flexure region is outside the rotor blade. The composite yoke fitting is bonded to the rotor blade.

This, and other aspects, can include one or more of the following features. The rotor blade can include an upper skin portion and a lower skin portion. To attach and bond the composite yoke fitting to the rotor blade, the outboard portion can be inserted between the upper skin portion and the lower skin portion. The upper skin portion and the lower skin portion can be bonded to the outboard portion. The composite yoke fitting can include an upper fitting portion and a lower fitting portion. To attach and bond the composite yoke fitting to the rotor blade, a portion of the upper fitting portion and a portion of the lower fitting portion can be inserted into the rotor blade. The portion of the upper fitting portion and the portion of the lower fitting portion can be bonded to the rotor blade. The inboard portion can be attached to a rotor hub assembly configured to rotate the rotor blade through a cutout formed in the inboard portion. The cutout can be configured to attach to a bearing in the rotor hub assembly.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Centrifugal force generated by a rotor blade can be transferred into the tail rotor hub in a variety of ways. For example, two-bladed tail rotor hubs can utilize a metallic block in the root end of the blade bonded to the blade skins or a cuff section of an inboard end of the blade that is integral to the blade skins. In another example, a composite strap, which is either bolted to the blade (e.g., roughly midspan) or bonded to the inner mold line (IML) surface of the blade, can be used. The composite strap can accommodate feathering/pitch change motion as well as centrifugal reaction. In a further example, the inboard end of the blade can be used as an attachment flange for a metallic fitting that can interface with the tail rotor hub in a variety of configurations. A fully articulated hub can utilize a spherical elastomeric centrifugal bearing in conjunction with a gas lead/lag damper. The inboard end of the blade is often bolted to the metallic fitting that interfaces with the spherical elastomeric centrifugal bearing and the damper.

This disclosure describes composite yoke fitting for bearing attachment to rotorcraft blade. In some implementations, a composite yoke fitting is integrated on an inboard end of a rotor blade, e.g., a tail rotor blade. The outboard end of the yoke fitting can be contoured and tapered to match the geometry of the blade skins. All components can be bonded together. The inboard end of the composite yoke fitting can include a cutout to facilitate attachment to the hub via a bearing, e.g., a spherical, elastomeric centrifugal bearing, which nests into the cutout in the composite yoke fitting. The rotor blade assembly described here can allow for the rotor blade to act as the primary load path for centrifugal force without the use of additional fittings, e.g., metallic fittings. Instead, the rotor blade assembly uses can integral composite yoke to transfer the centrifugal force from the rotor blade into the centrifugal force bearing. This style of blade can provide a low frontal cross-section which can provide manufacturing benefits when compared to tail rotor blades with open-style inbound ends. The rotor blade assembly can eliminate the use of additional fittings and/or bolted joints that are typically used to provide an interface between the root end of the blade and the bearing in the rotor blade assembly. The resulting rotor blade assembly can be lighter with a more durable interface with fewer parts relative to rotor blade assemblies that use fittings and/or bolted joints.

Figure 1:
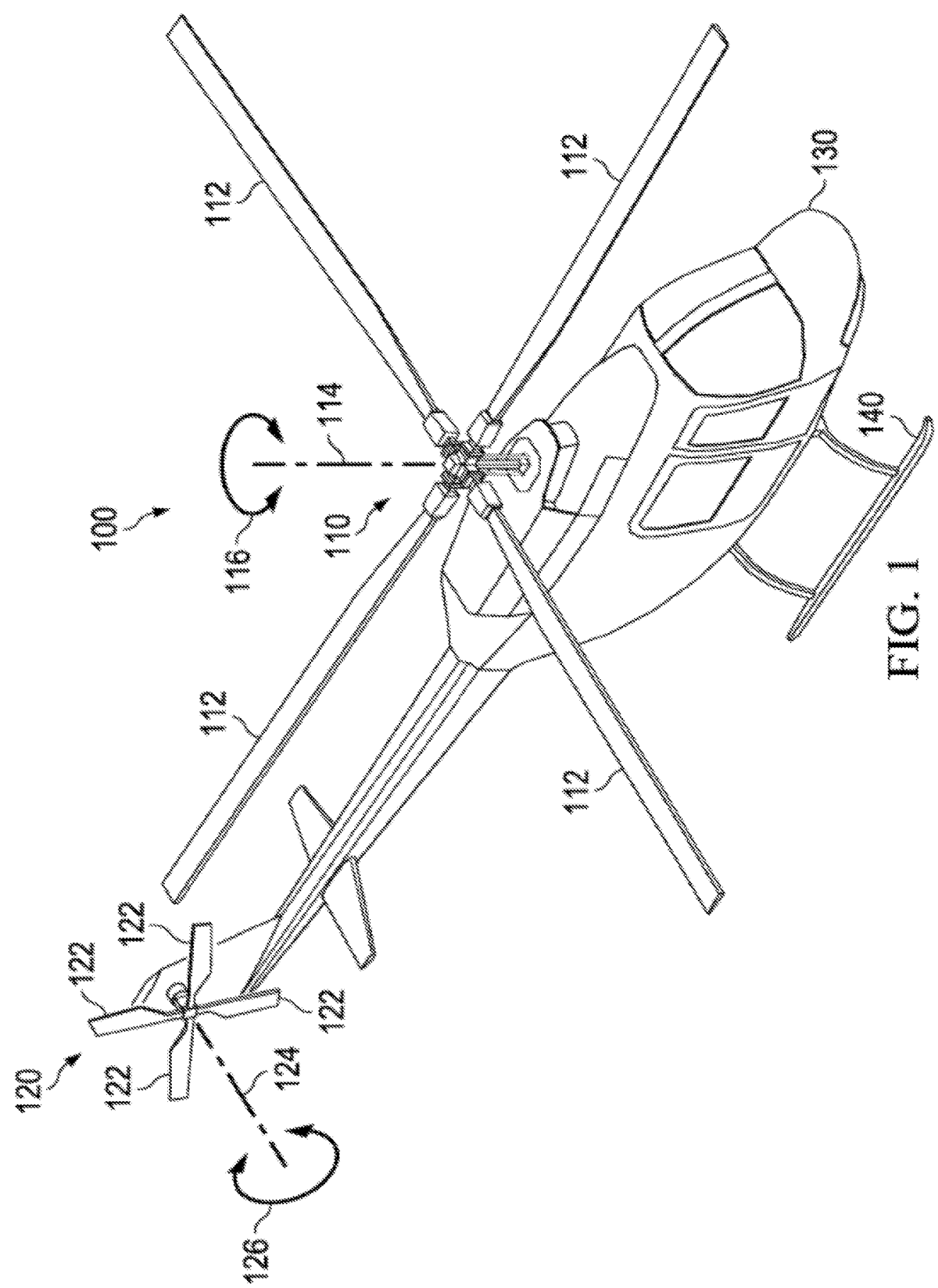
FIG. 1 is a perspective view of a helicopter.

FIG. 1 is a perspective view of a helicopter 100. Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. Main rotor assembly generates a lift force that supports the weight of helicopter 100 and a thrust force that counteracts aerodynamic drag. Main rotor assembly 110 can also be used to induce pitch and roll of helicopter 100. Tail rotor assembly 120 includes two or more blades 122 that are rotated about an axis of rotation 124 in either a clockwise direction or a counterclockwise direction as indicated by arrow 126. Tail rotor assembly 120 counters the torque effect created by main rotor assembly 110 and allows a pilot to control the yaw of helicopter 100. Fuselage 130 is the main body section of helicopter 100. Fuselage 130 can hold the crew, passengers and/or cargo, and can house the engine, transmission, gear boxes, drive shafts, control systems, etc., that make the helicopter 100 operable. Landing gear 140 can be attached to fuselage 130 and can support the helicopter 100 on the ground, allowing the helicopter to take off and land. The composite yoke fitting described here can be implemented in either the blades 112 of the main rotor assembly 110 or the blades 122 of the tail rotor assembly 120. In addition, the composite yoke fitting can be implemented with blades in other types of aircrafts, e.g., tiltrotors.

Figure 2:
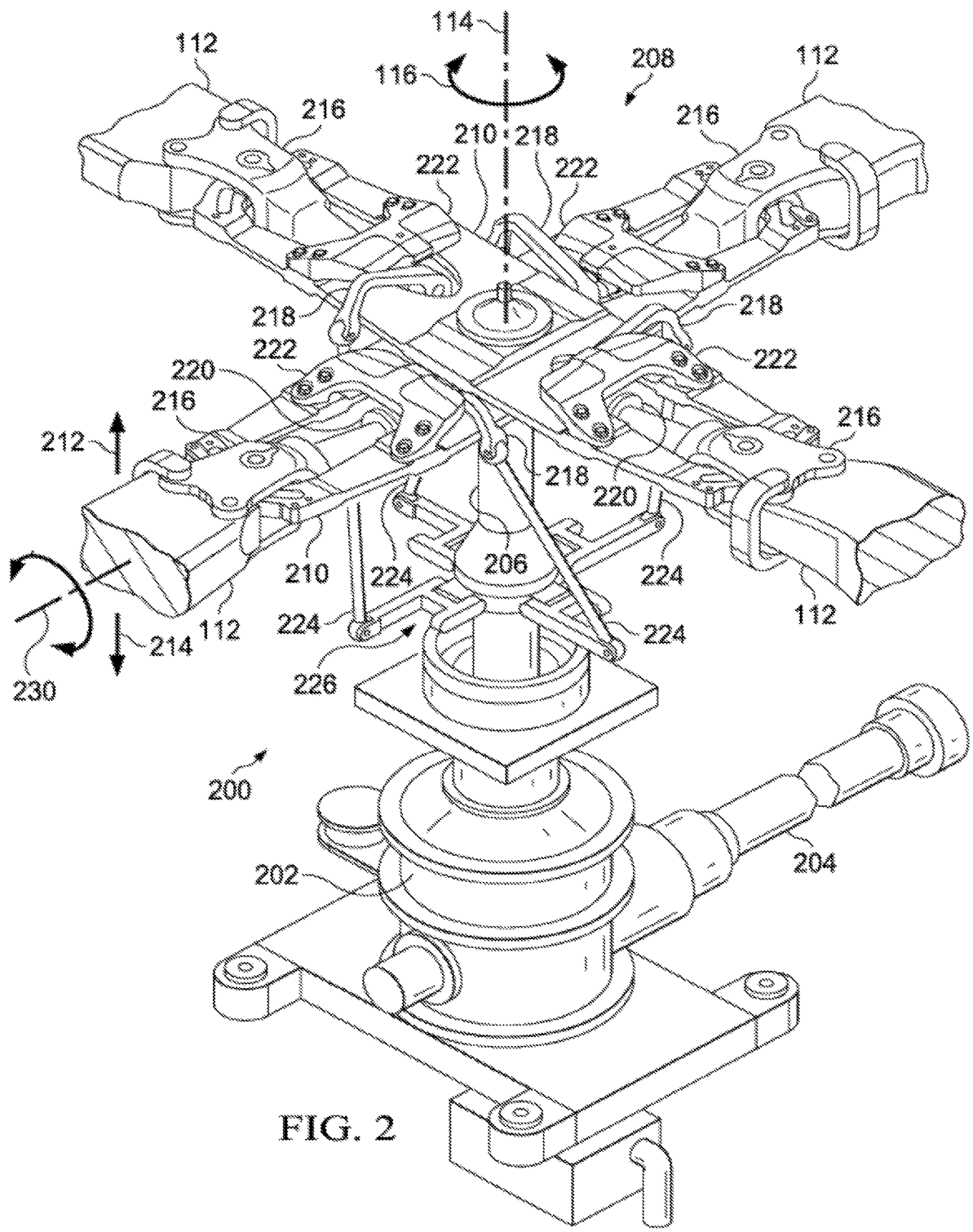
FIG. 2 is a perspective view of a power train.

FIG. 2 is a perspective view of a power train 200. Power train 200 can be used in a rotor assembly of a helicopter such as helicopter 100 shown in FIG. 1 or in other rotor assemblies (e.g., fully articulated, rigid, semi-rigid, gimbaled, or other rotor assemblies) having any number of blades (e.g., 2, 3, 4, 5, 6, or other number of blades). Power train 200 can include a transmission 202 that receives power from an engine (not shown) through a driveshaft 204. Transmission 202 can drive accessories and control the rotation as shown by arrow 116 of mast 206 about an axis of rotation 114. Mast 206 can transfer its rotational movement to blades 112 through a hub 208 that connects mast 206 to blades 112. Hub 208 can include one or more flexible yokes 210 that enable blades 112 to flap up and down in the directions indicated by arrows 212 and 214, respectively. The hub 208 can include a main rotor grip 216 for each blade 112 that is attached to hub 208. Main rotor grip 216 can include an outboard end that attaches to a blade 112, an inboard end that attaches to a pitch horn 218, and a spindle between the outboard end and the inboard end. The spindle can be supported by a shear bearing 220 that holds the spindle in place and allows it to rotate. The shear bearing 220 can, in turn, be held by a bridge plate 222 that attaches shear bearing 220 to yoke 210.

Each pitch horn 218 can be connected to a pitch linkage 224. Each pitch linkage 224 can be drive up and down, e.g., in the directions of arrows 212 and 214, respectively, by a swashplate assembly 226. As swashplate assembly 226 moves, it drives pitch linkage 224, which drives pitch horn 218 which rotates main rotor grip 216 about shear bearing 220, allowing the pitch of each of the blades 112 to be controlled. For example, each blade 112 can rotate clockwise or counterclockwise about an axis of rotation 230 that runs along the length of each blade 112.

Figure 3:
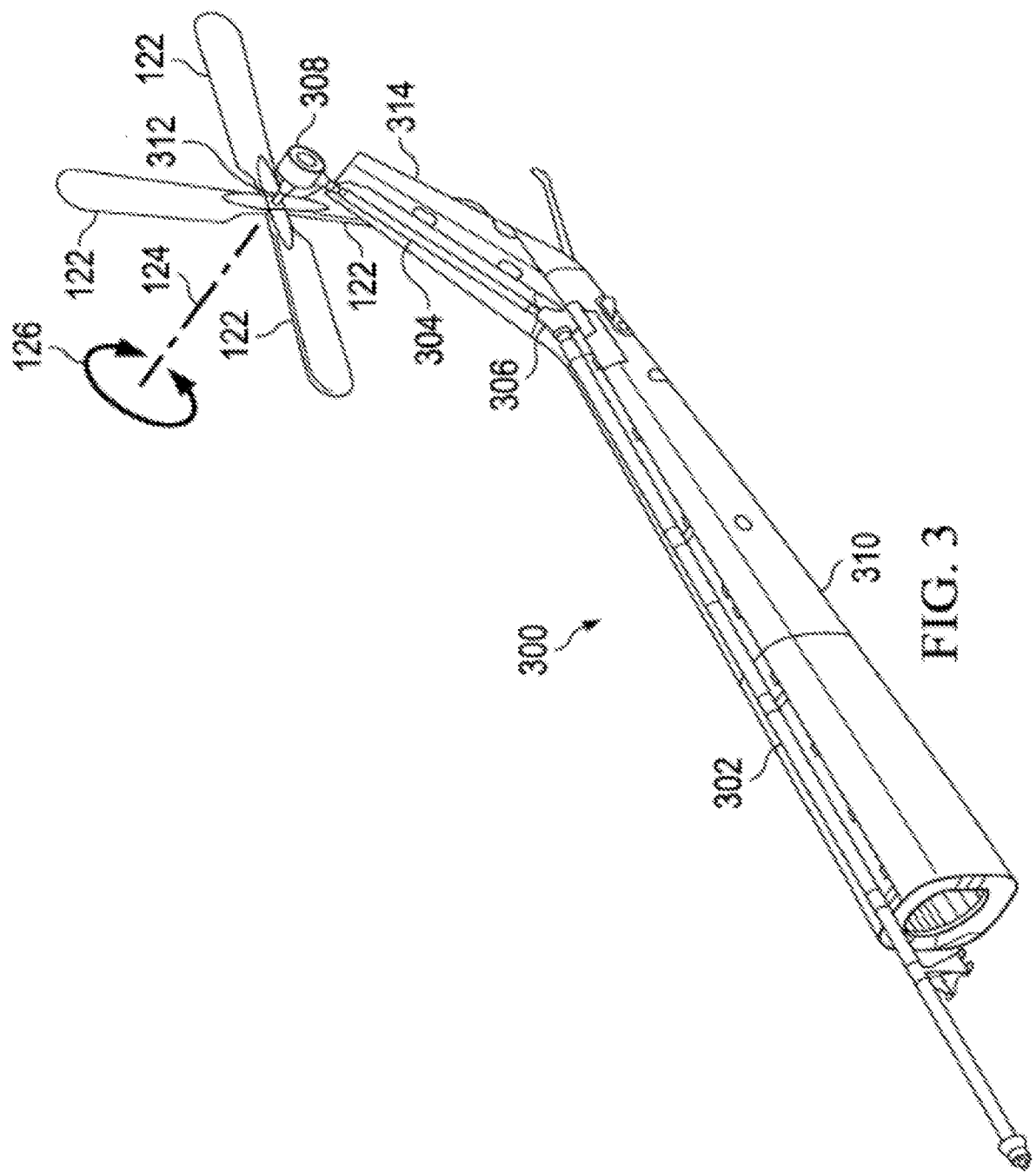
FIG. 3 is a perspective view of a tail rotor drive assembly.

FIG. 3 is a perspective view of a tail rotor drive assembly 300. Tail rotor drive assembly 300 can be used in a helicopter, e.g., the helicopter 100. The tail rotor drive assembly 300 can include a first driveshaft segment 302, a second driveshaft segment 304, an intermediate gearbox 306 and a tail rotor gearbox 308. The driveshaft segments 302, 304 and gearboxes 306, 308 can be housed in a tail boom 310 and a tail 314 that are components of a helicopter fuselage, e.g., fuselage 130. A first driveshaft segment 302 can be driven by a transmission (e.g., transmission 202) and can be connected to intermediate gearbox 306. The intermediate gearbox 306 can translate rotation from first driveshaft segment 302 to second driveshaft segment 304. The second driveshaft segment 304 can be connected to tail rotor gearbox 308 that translates rotation from second driveshaft segment 304 to tail rotor mast 312. For example, tail rotor gearbox 308 can be used to rotate tail rotor mast 312 about an axis of rotation 124 that is at substantially a 90° angle with respect to second driveshaft segment 304. Additionally, one or both of gearboxes 306 and 308 may increase or decrease the speed of rotation (e.g., increase or decrease the number of revolutions per minute) such that tail rotor blades 122 are rotated either clockwise or counterclockwise at an appropriate speed in the directions indicated by arrow 126.

Figure 4:
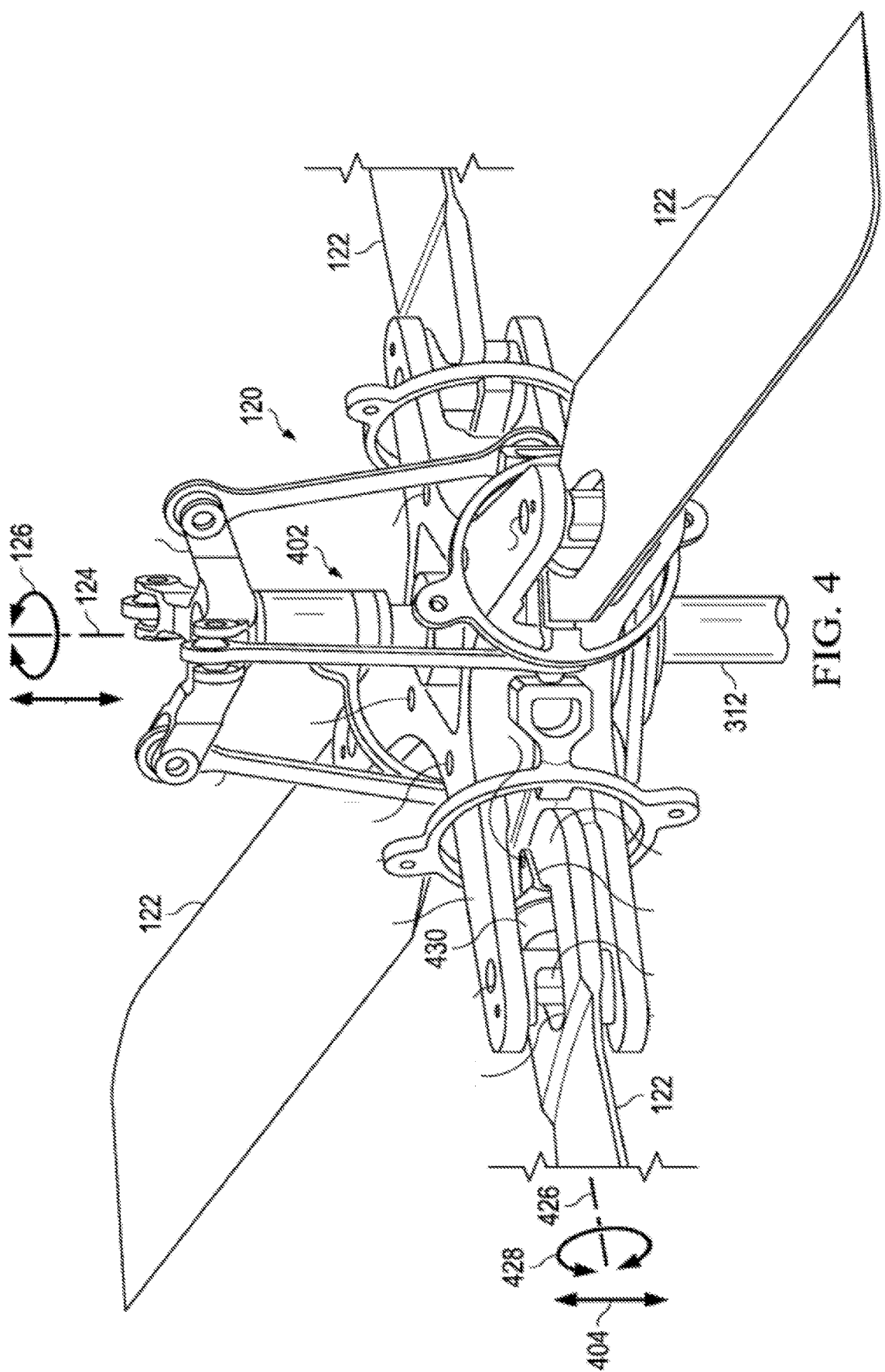
FIG. 4 is a perspective view of a tail rotor assembly having a tail rotor hub.

FIG. 4 is a perspective view of a tail rotor assembly 120 having a tail rotor hub 402. The tail rotor hub 420 can include a gimbal assembly that can attach tail rotor hub 402 to tail rotor mast 312. The gimbal assembly can translate rotational movement of tail rotor mast 312 to tail rotor hub 402 such that both tail rotor mast 312 and tail rotor hub 402 rotate about axis of rotation 124 in the directions indicated by arrow 126. In addition, the gimbal assembly can enable tail rotor hub 402 and the attached blades 122 to flap in the directions indicated by arrow 404. Each tail rotor blade 122 is supported by a CF bearing 430. Each CF bearing is configured to support a blade 122 and withstand centrifugal force that is generated as blade 122 is rotated about tail rotor mast 312. CF bearing 430 is also configured to accommodate blade 122 pitch changes (e.g., blade 122 rotation about axis 426 in the directions indicated by arrow 428). In an embodiment, CF bearing 430 is an elastomeric bearing (e.g., a spherical elastomeric bearing). Spherical elastomeric bearings can be easier to maintain relative to other types of bearings (e.g., stainless steel bearings with Teflon/Dacron coatings).

Figure 5A:
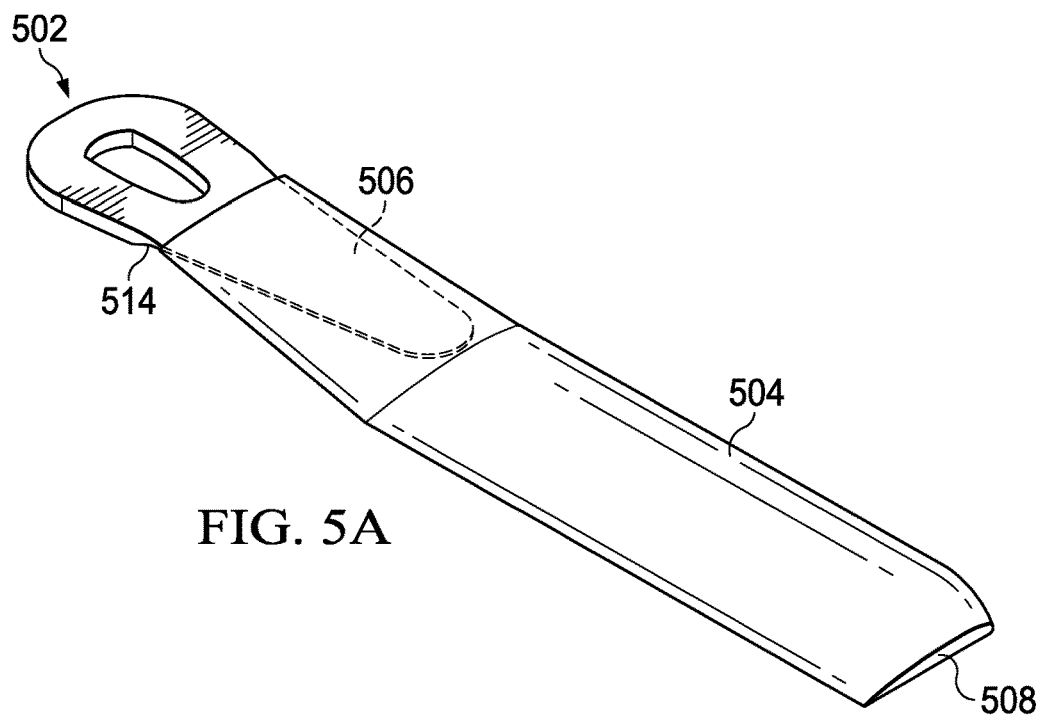
FIGS. 5A-5E are example views of a composite yoke fitting attached to a rotor blade.
Figure 5B:
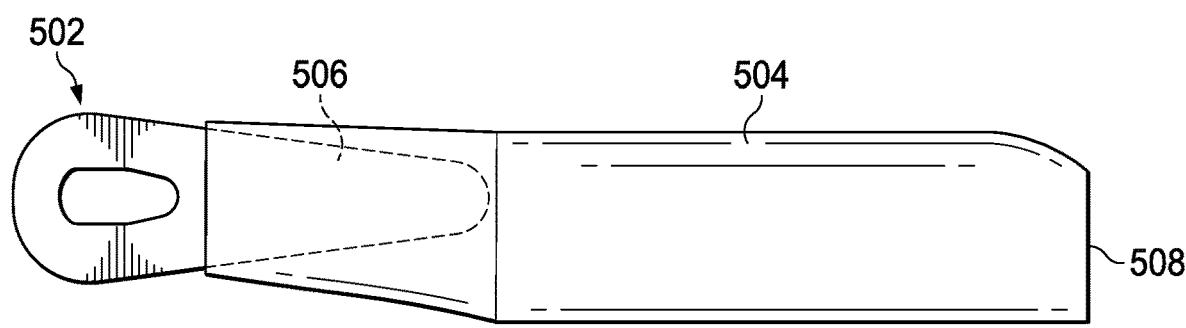
Figure 5C:
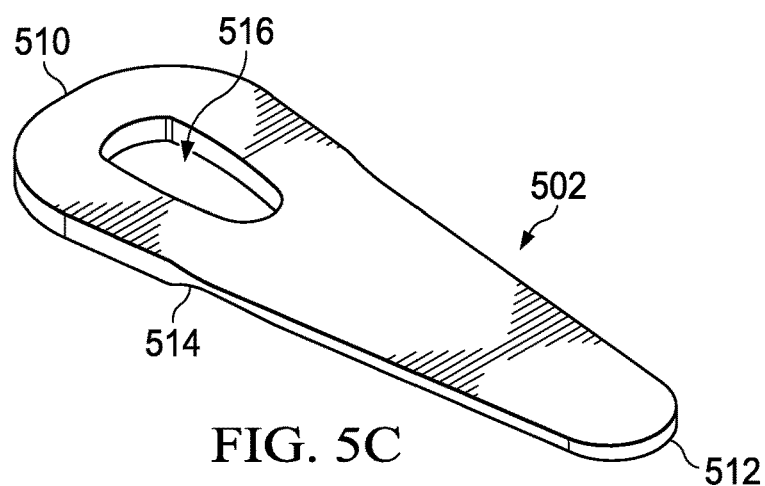

FIGS. 5A-5E are example views of a composite yoke fitting attached to a rotor blade to form a rotor blade assembly. FIG. 5A and FIG. 5B are a perspective view and a top view, respectively, of the composite yoke fitting 502 attached to a rotor blade 504. FIG. 5C is a perspective view of the composite yoke fitting 502. The rotor blade 502 includes an inboard end 506 and an outboard end 508. The inboard end 506 is connected to the rotor assembly (not shown in FIGS. 5A-5C). The composite yoke fitting 502 is made from a composite material. The composite material can include laminated tape or wound roving material formed into belts. The composite yoke fitting 502 includes an outboard portion 512 and an inboard portion 510. The outboard portion 512 is configured to be inserted into the inboard end 506 of the rotor blade 504. A length of the outboard portion 512 that is inserted into the inboard end 506 of the rotor blade 504 can have sufficient area to transfer centrifugal force load from the rotor blade skins to the composite yoke fitting 502. The composite yoke fitting 502 also includes a flexure region 514 about which the rotor blade 504 is configured to flex during operation. When the composite yoke fitting 502 is attached to the rotor blade 504, the inboard portion 510 and the flexure region 514 are outside the rotor blade 504.

The inboard portion 510 of the composite yoke fitting 502 is configured to attach to a rotor hub assembly configured to rotate the rotor blade 504, e.g., the tail rotor assembly 120. In some implementations, composite yoke fitting 502 includes a cutout 516, e.g., in the inboard portion 510. The cutout 516 is configured to attach to a bearing in the rotor hub assembly. The cutout can include a through hole formed in the inboard portion 510 to accommodate the installation of the bearing, e.g., a spherical elastomeric bearing, which, among other functions, can transfer centrifugal force into the tail rotor assembly 120. In some implementations, the composite yoke fitting 502 can taper from the inboard portion 510 toward the outboard portion 512. For example, a width of the composite yoke fitting 502 at an end of the inboard portion 510 can be greater than a width at an end of the inboard portion 510. The tapering width can give the composite yoke fitting 502 a substantially triangular appearance.

The flexure region 514 is between the inboard portion 510 and the outboard portion 512. A thickness of the flexure region 514 can be less than a thickness of the outboard portion 512 and a thickness of the inboard portion 510. In a side view, a thickness of the composite yoke fitting 502 can be substantially constant in the inboard portion 510, decrease as the composite yoke fitting 502 transitions from the inboard portion 510 to the flexure region 514, increase as the composite yoke fitting 502 transitions from the flexure region 514 to the outboard portion 512, and be substantially constant in the outboard portion 512.

Figure 5D:
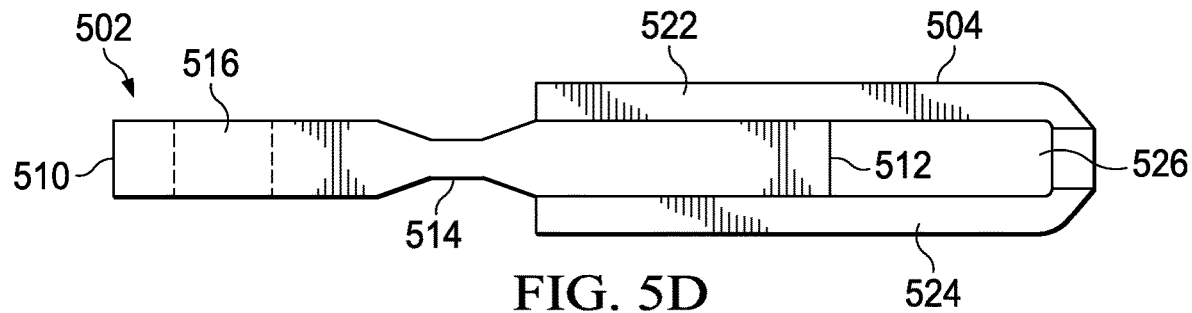
Figure 5E:
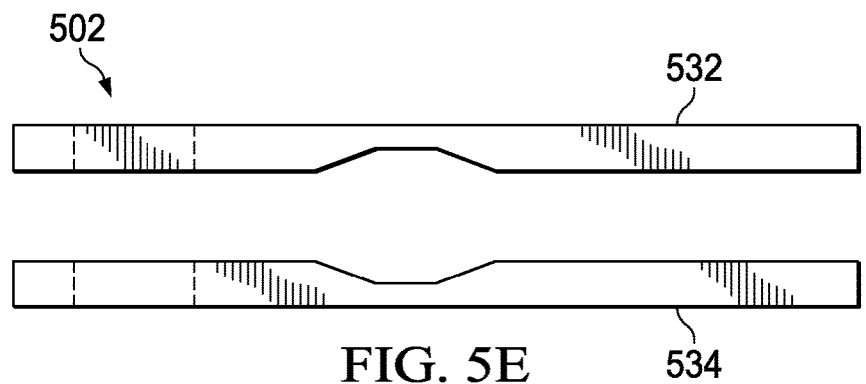
Figure 6:
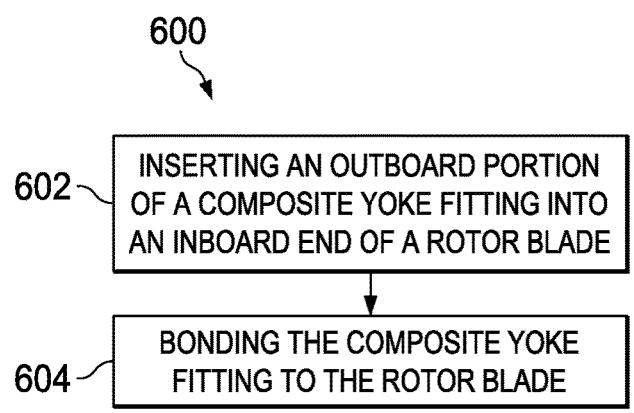
FIG. 6 is a flowchart of an example process for attaching a composite yoke fitting to a rotor blade.

FIG. 6 is a flowchart of an example process 600 for attaching a composite yoke fitting to a rotor blade. The process 600 can be implemented, for example, in a shop floor while manufacturing a rotor blade assembly such as the rotor blade assembly described above with reference to FIGS. 5A-5E. At 602, an inboard portion of a composite yoke fitting is inserted into an inboard end of a rotor blade. The composite yoke fitting, for example, the composite yoke fitting 502, can include an outboard portion and a flexure region about which the rotor blade is configured to flex. The inboard portion and the flexure region can be outside the rotor blade. At 604, the composite yoke fitting is attached to, for example, bonded to or otherwise adhered to, the rotor blade. In some implementations, the rotor blade, for example, the rotor blade 504, can include an upper skin portion 522 and a lower skin portion 524 between which the rotor blade material 526, e.g., a foam core such as rohacell or molded polyurethane foam is positioned, as shown in FIG. 5D. The outboard portion 512 of the composite yoke fitting 502 can be sandwiched and bonded between the upper skin portion 522 and the lower skin portion 524. In some implementations, the composite yoke fitting 502 can include an upper fitting portion 532 and a lower fitting portion 532, as shown in FIG. 5E. A portion of the upper fitting portion 532 and a portion of the lower fitting portion 534 can be inserted into the inboard end 506 of the rotor blade 504. The portion of the upper fitting portion 532 and the portion of the lower fitting portion 534 can be bonded to, adhered to, or otherwise attached to the rotor blade 504. The inboard portion 510 of the composite yoke fitting 502 can then be attached to the rotor hub assembly, e.g., the tail rotor assembly 120, through the cutout 516.

Thus, particular implementations of the subject matter have been described. Other implementations are within the scope of the following claims.

What is claimed is:

1. A tail rotor blade assembly comprising:
 a tail rotor blade comprising an inboard end, an outboard end, an upper skin portion, a lower skin portion, and a core material sandwiched and bonded between the upper skin portion and the lower skin portion; and
 a composite yoke fitting made from a composite material, the composite yoke fitting attached to the tail rotor blade, wherein the composite yoke fitting comprises:
  an outboard portion inserted into the inboard end of the tail rotor blade, the outboard portion sandwiched only between the upper skin portion and the lower skin portion and extending spanwise to the core material disposed between the outboard portion and the outboard end of the tail rotor blade,
  an inboard portion, and
  a flexure region about which the tail rotor blade is configured to flex, wherein the inboard portion and the flexure region are outside of the upper skin portion and lower skin portion of the tail rotor blade.

2. The assembly of claim 1, wherein the inboard portion is configured to attach to a tail rotor hub assembly configured to rotate the tail rotor blade.

3. The assembly of claim 2, wherein the inboard portion comprises a cutout configured to attach to a bearing in the tail rotor hub assembly.

4. The assembly of claim 3, wherein the cutout comprises a through hole formed in the inboard portion.

5. The assembly of claim 1, wherein a width of the composite yoke fitting from a leading side to a trailing side tapers from the inboard portion to the outboard portion.

6. The assembly of claim 5, wherein the outboard portion of the composite yoke fitting is substantially triangular shaped when viewed from a top of the composite yoke fitting.

7. The assembly of claim 1, wherein the flexure region is between the outboard portion and the inboard portion, the flexure region having a thickness less than a thickness of the outboard portion and a thickness of the inboard portion.

8. The assembly of claim 1, wherein the composite yoke fitting comprises an upper fitting portion and a lower fitting portion for a length of the composite yoke fitting.

9. The assembly of claim 8, wherein a portion of the upper fitting portion and a portion of the lower fitting portion are inserted into the inboard end of the tail rotor blade.

10. A method of forming a tail rotor assembly comprising:
providing a tail rotor blade comprising an inboard end, an outboard end, an upper skin portion and a lower skin portion, and a core material sandwiched and bonded between the upper skin portion and the lower skin portion;
inserting an outboard portion of a composite yoke fitting into the inboard end of the tail rotor blade, the outboard portion sandwiched only between the upper skin portion and the lower skin portion and extending spanwise to the core material disposed between the outboard portion and the outboard end of the tail rotor blade, the composite yoke fitting comprising the outboard portion and a flexure region about which the tail rotor blade is configured to flex, wherein an inboard portion and the flexure region are outside of the upper skin portion and lower skin portion of the tail rotor blade; and
bonding the composite yoke fitting to the tail rotor blade.

11. The method of claim 10, further comprising attaching the inboard portion to a tail rotor hub assembly configured to rotate the tail rotor blade.

12. The method of claim 11, wherein the inboard portion comprises a cutout configured to attach to a bearing in the tail rotor hub assembly, and wherein the inboard portion is attached to the tail rotor hub assembly through the cutout.

13. The method of claim 12, wherein the cutout comprises a through hole formed in the outboard portion.

14. The method of claim 10, wherein the flexure region is between the inboard portion and the outboard portion, the flexure region having a thickness less than a thickness of the outboard portion and a thickness of the inboard portion.

15. The method of claim 10, wherein the composite yoke fitting comprises an upper fitting portion and a lower fitting portion for a length of the composite yoke fitting, and wherein a portion of the upper fitting portion and the lower fitting portion are inserted between and bonded to a portion of the upper skin portion and a portion of the lower skin portion.

16. The method of claim 10, wherein a width of the composite yoke fitting from a leading side to a trailing side tapers from the inboard portion to the outboard portion in a substantially triangular shape when viewed from a top of the composite yoke fitting.

17. A method of forming a tail rotor assembly comprising:
attaching a composite yoke fitting comprising an outboard portion, a flexure region, and an inboard portion to a tail rotor blade, by inserting the outboard portion of the composite yoke fitting into an inboard end of the tail rotor blade, the outboard portion sandwiched only between an upper skin portion and a lower skin portion of the tail rotor blade, wherein the outboard portion of the composite yoke extends spanwise to a core material disposed between the outboard portion and the outboard end of the tail rotor blade, the core material sandwiched and bonded between the upper skin portion and the lower skin portion of the tail rotor blade, and the flexure region of the composite yoke fitting is outside of the upper skin portion and lower skin portion of the tail rotor blade; and
bonding the composite yoke fitting to the tail rotor blade by bonding the upper skin portion and the lower skin portion of the tail rotor blade to the outboard portion of the composite yoke fitting.

18. The method of claim 17, wherein the composite yoke fitting comprises an upper fitting portion and a lower fitting portion for a length of the composite yoke fitting, and wherein attaching and bonding the composite yoke fitting to the tail rotor blade comprises:
inserting a portion of the upper fitting portion and a portion of the lower fitting portion into the inboard end of the tail rotor blade; and
bonding the portion of the upper fitting portion and the portion of the lower fitting portion to the tail rotor blade.

19. The method of claim 17, further comprising attaching the inboard portion to a tail rotor hub assembly configured to rotate the tail rotor blade through a cutout formed in the inboard portion, the cutout configured to attach to a bearing in the tail rotor hub assembly.

20. The method of claim 17, wherein a width of the composite yoke fitting from a leading side to a trailing side tapers from the inboard portion to the outboard portion in a substantially triangular shape when viewed from a top of the composite yoke fitting.

* * * * *